INVENTORS.
JOSEPH S. WINNEFELD.
RAYMOND A. HAMMON.
BY Lockwood Goldsmith & Galt
ATTORNEYS.

Patented June 18, 1940

2,205,195

UNITED STATES PATENT OFFICE 2,205,195

RADIALLY DEMOUNTABLE ROTATABLE ELEMENT

Raymond A. Hammon and Joseph S. Winnefeld, Indianapolis, Ind.

Application January 22, 1938, Serial No. 186,350

2 Claims. (Cl. 15—179)

This invention relates to a rotatable element such as a brush, pulley or the like, secured to a shaft for rotation thereby which shaft may support like or similar elements and be supported in relatively fixed bearings.

It is quite obvious that, having reference to shoe machinery, by way of example only, an elongated shaft is supported adjacent its ends and if desired at an intermediate point, or points. To the same may be secured, grinding wheels, skiving wheels, burnishing wheels and brushing wheels. In the latter instance one is used for light shoes (tan, et cetera) and another is used for black shoes.

When any one of these devices requires repair or replacement, it has been necessary to remove the shaft from the supporting bearings and usually this requires removal of all other devices on the shaft between the element to be replaced and the shaft end.

The object of the present invention is to permit exchange or replacement of such an element without removing the shaft from its bearings or other elements on that shaft, as described.

The chief feature of the present invention is the radial sectioning of the element and the connection of the parts in peripheral relation and more especially the instrumentalities utilized for such connection.

Another feature of the invention is that, for the same size supporting shaft, like instrumentalities may be employed independent of the variation in element width.

Another feature of the invention is that in at least one embodiment of the invention, the several cooperating instrumentalities are identical.

Other objects and features will be pointed out more fully hereinafter.

The full nature of the invention will be understood from the accompanying drawing and the following description and claims:

In the drawing, Fig. 1 is a side elevation of a portion of a rotatable shaft supporting a plurality of elements, each of which embodies the basic invention, each element having a portion broken away to show in central section a portion of said element.

Figure 1:
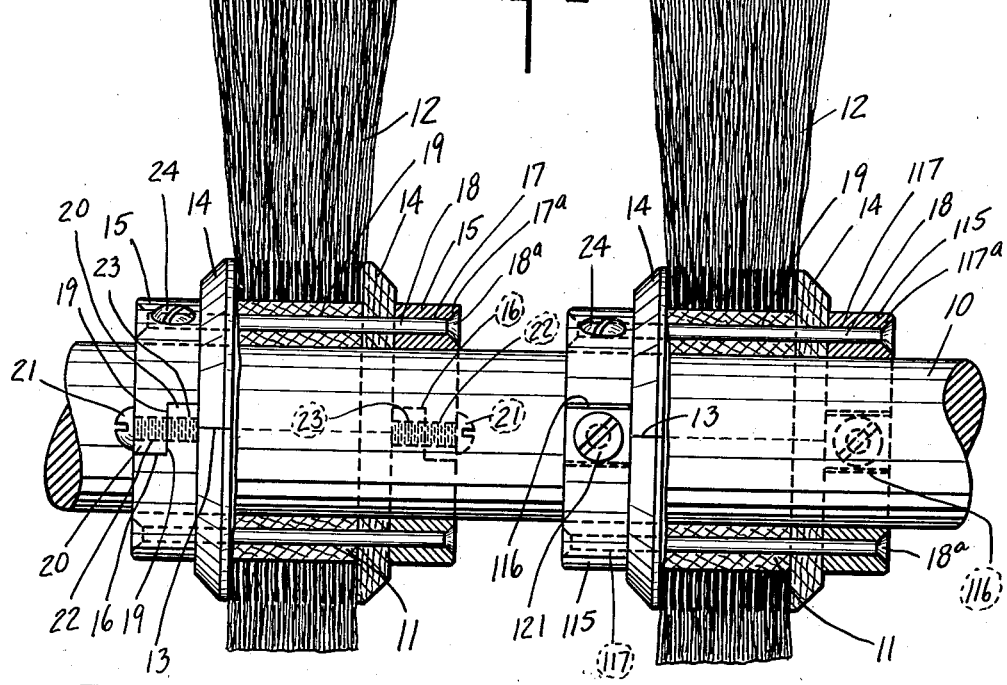

In Fig. 1, 10 indicates a rotatable shaft of the character hereinbefore briefly described. Mounted thereon are a plurality of elements for rotation thereby. These are herein illustrated, for example only, as brushes but they may be of other character as hereinbefore set forth.

Figure 2:
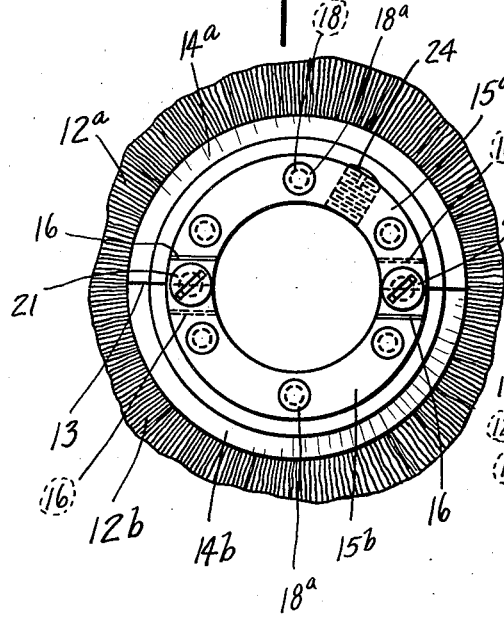
Fig. 2 is a side elevation of a portion of the left hand element shown in Fig. 1 and removed from the shaft.

The left hand element includes a hub or base 11 and bristles, or like, 12 suitably supported thereby. In Fig. 2 the same are shown divided diametrically at 13 forming two similar halves and numerals with subscripts $a$ and $b$ indicate upper and lower halves. The hub 11 may include two side plates 14, each similarly divided. All may be suitably secured together as by gluing or otherwise, or the hub and side plates may be formed integral as when the base is of molded character.

Adjacent each side plate 14 is a collar 15 similarly divided but the division is of broken joint or offset character as indicated at 16. Each half collar is provided with a suitable number of apertures 17 by which the half collar through members 18 may be secured to the base.

Herein each aperture 17 is countersunk at 17a and member 18 includes the head portion 18a nested therein. In the present disclosure, the hub is apertured at 19.

All the apertures register as shown in Fig. 1 so that member 18 may consist of an elongated rivet. Screws may be utilized, however, which have their heads seated in enlargements 17a and extend through apertures 17 into the hub 11.

Herein each half collar broken joint includes a recessed end 19 and an adjacent tongue 20, the adjacent two upon peripherally arranged portions of the collar interfitting. A screw bolt 21 extends through the aperture 22 in the outer tongue portion 20 and is threaded into the registering threaded aperture 23 in inner tongue portion 20.

In this form of the invention each half collar is identical to the other complementary collar.

A locking screw 24 or other equivalent means secures the brush structure to the shaft for rotation thereby. When two screws 24 are used, they are opposed, that is, one in each collar. When necessary, four screws may be used—one in each half collar. Such type of anchorage is conventional for any wheel or brush anchorage to a shaft and forms no part of this invention.

Figure 3:
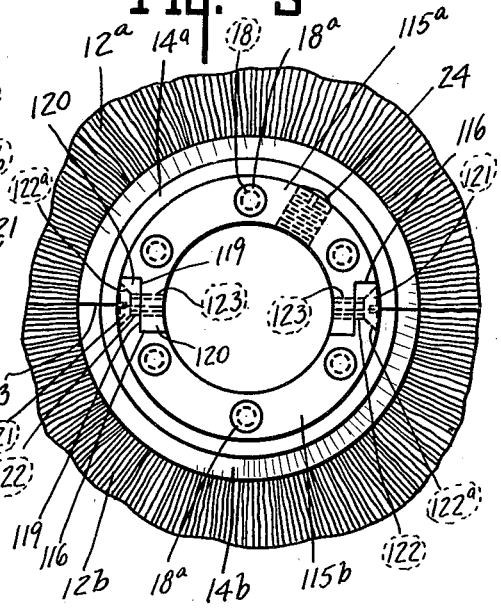
Fig. 3 is a similar view of the right hand element.

In the right hand portion of Fig. 1 and in Fig. 3, there is illustrated a modified form of the invention. For simplicity, the brush is illustrated as formed in the same manner as that previously described and no further reference need be made thereto. The difference is in the collar structure. The same numerals in Fig. 3 and the right hand portion indicate like parts previously described. Similar parts are indicated by numerals of the one hundred series.

In Fig. 3 and the right hand portion of Fig. 1, the collars 115 are divided as at 116. Each half collar includes similar apertures 117 by which, through members 18, the same are secured to the base. Each aperture is countersunk at 117a and each member 18 includes the head portions 18a.

Each half collar includes a recessed end 119 and an adjacent tongue 120, the adjacent two co-operating portions upon peripherally arranged collar portions interfitting. A screw bolt 121 extends through aperture 122 in the outer tongue portion 120 and is threaded into the registering threaded aperture 123 in the inner tongue portion 120.

In this form of the invention, the half collars are complementary and the half collar with the two outermost tongues has its apertures countersunk as at 122a so that no portion of the screw bolt projects beyond the collar.

The aperture 23 in the first half collar form may be similarly relieved but the same is not as important as it is where the screw extends radially of the shaft.

While for simplicity, the apertures 22 and 122 have not been described as threaded, nevertheless whenever desired or required they may be threaded as illustrated herein in the several figures. Any tendency of the sections to separate locks with the thread portions of the connecting bolts so that centrifugal force is effective to counteract the effort of vibration to unscrew the bolts.

While the invention has been described in detail, the same is to be considered as illustrative and not restrictive in character and various modifications herein suggested as well as others which will readily suggest themselves to persons skilled in this art, are all considered to be within the broad scope of the invention, reference being had to the appended claims.

The invention claimed is:

1. A rotatable element for shaft mounting for rotation by the shaft including a plurality of segmental character portions arranged in shaft enveloping relation, a collar in shaft enveloping relation at each side of said segmental portions and of segmental portion character and spaced by said first mentioned portions, means rigidly securing the opposed collar portions to the intermediate portion, and means securing the adjacent ends of adjacent collar portions together and constituting the sole means for peripheral connection arrangement, the means securing the opposed collar portions to the intermediate portion being embedded in and extending entirely through the intermediate portion and terminating at opposite ends in anchoring relation in the opposed collar portions.

2. A rotatable element for shaft mounting for rotation by the shaft including a plurality of segmental character portions arranged in shaft enveloping relation, a collar in shaft enveloping relation at each side of said segmental portions and of segmental portion character and spaced by said first mentioned portions, means rigidly securing the opposed collar portions to the intermediate portion, and means securing the adjacent ends of adjacent collar portions together and constituting the sole means for peripheral connection arrangement, each end of a collar portion including a tongue and an adjacent recessed portion, the tongue of one collar portion end seating in the recess of the adjacent collar portion end and the tongue of said adjacent collar portion end seating in the recess of the first mentioned adjacent collar portion end, the tongue and recess arrangement being longitudinally directed relative to the axis of rotation.

RAYMOND A. HAMMON.
JOSEPH S. WINNEFELD.